United States Patent
Daly et al.

(10) Patent No.: US 9,143,978 B2
(45) Date of Patent: Sep. 22, 2015

(54) NETWORK CONGESTION PREVENTION AND/OR MITIGATION

(71) Applicant: AT&T Intellectual Property I, LP, Atlanta, GA (US)

(72) Inventors: Brian Kevin Daly, Peachtree Corners, GA (US); Charles Peter Musgrove, Henderson, NV (US); DeWayne A. Sennett, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 250 days.

(21) Appl. No.: 13/708,498

(22) Filed: Dec. 7, 2012

(65) Prior Publication Data

US 2014/0162582 A1 Jun. 12, 2014

(51) Int. Cl.
  *H04M 11/04* (2006.01)
  *H04W 28/02* (2009.01)
  *H04W 4/22* (2009.01)
  *H04W 76/00* (2009.01)

(52) U.S. Cl.
  CPC ........... *H04W 28/0289* (2013.01); *H04W 4/22* (2013.01); *H04W 76/007* (2013.01)

(58) Field of Classification Search
  CPC ..... H04W 4/22; H04W 76/007; H04W 76/02;
  H04W 24/00; H04W 28/02; H04W 28/0289;
  H04W 48/06; H04L 12/5695; H04L 47/10;
  H04L 47/11; G08B 25/004; G08B 25/009
  USPC ..................... 455/404.1, 521, 515
  See application file for complete search history.

(56) References Cited

U.S. PATENT DOCUMENTS

| | | | |
|---|---|---|---|
| 2002/0102978 A1* | 8/2002 | Yahagi | 455/437 |
| 2002/0183039 A1* | 12/2002 | Padgett et al. | 455/406 |
| 2007/0103317 A1* | 5/2007 | Zellner et al. | 340/573.1 |
| 2009/0077173 A1* | 3/2009 | Lowery et al. | 709/203 |
| 2009/0157829 A1* | 6/2009 | Choi et al. | 709/206 |
| 2009/0248828 A1* | 10/2009 | Gould et al. | 709/207 |
| 2010/0003988 A1* | 1/2010 | Buckley et al. | 455/436 |
| 2010/0169449 A1* | 7/2010 | Lin et al. | 709/206 |
| 2011/0099587 A1* | 4/2011 | O'Neil | 725/62 |
| 2011/0134206 A1* | 6/2011 | Kjesbu et al. | 348/14.08 |
| 2012/0207023 A1* | 8/2012 | Tsuda | 370/235 |

* cited by examiner

Primary Examiner — Olumide T Ajibade Akonai
Assistant Examiner — Edward Zhang
(74) Attorney, Agent, or Firm — Baker & Hostetler LLP

(57) ABSTRACT

Cell site congestion may result in dropped calls, time-outs on data sessions, web access problems, or the like. A network congestion status may be used to minimize network congestion. In an example embodiment, messages which are distributed via a network may be formatted based on the network's congestions status and a device's connection mechanism. Further, a network access may be based on the network's congestion status and on a device's connection mechanism.

15 Claims, 10 Drawing Sheets

NETWORK CONGESTION PREVENTION AND/OR MITIGATION

TECHNICAL FIELD

The technical field generally relates to network communications, and more specifically relates to managing network congestion associated with network communications.

BACKGROUND

When a wireless device is connected to a network, the device may be subject to constraints of the network. A packet-based mobile cellular network environment may be subject to physical limitations. Such physical limitations may be based on, for example, the available spectrum and the associated technology that is used on a cell site. Cell site congestion may occur when desired usage exceeds the physical limitations of the cell site. Cell site congestion may result in dropped calls, time-outs on data sessions, web access problems, or the like.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

A network congestion status may be used to minimize network congestion. In an example embodiment, a message may be received via a network. In response to the message, a congestion status of the network may be determined. If the network is not congested, full access may be granted to a device. If the network is congested, limited access may be granted to the device. Whether the network is congested may be determined by comparing the congestion status to a predetermined threshold. In another example embodiment, the format of a message that is distributed to a device may depend on the congestion status of the network and on the connection mechanism of the device. For example, if the connection mechanism comprises an indirect network connection, such as a W-Fi or femtocell connection, the device may receive a message according to a first format. If the connection mechanism comprises a direct network connection, such as 3G or 4G connection, the device may receive a message according to a second format that uses less resources of the network than the first format.

The format of distributed messages in a network and/or network access may depend on the congestion status of the network. Further, as described herein, the format of distributed messages in a network and/or a network access may depend on the manner in which a device is connected to the network, which may be referred to as the device's connection mechanism.

BRIEF DESCRIPTION OF THE DRAWINGS

Reference is made here to the accompanying drawings, which are not necessarily drawn to scale.

DETAILED DESCRIPTION OF ILLUSTRATIVE EMBODIMENTS

Aspects of the instant disclosure are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

Figure 1:
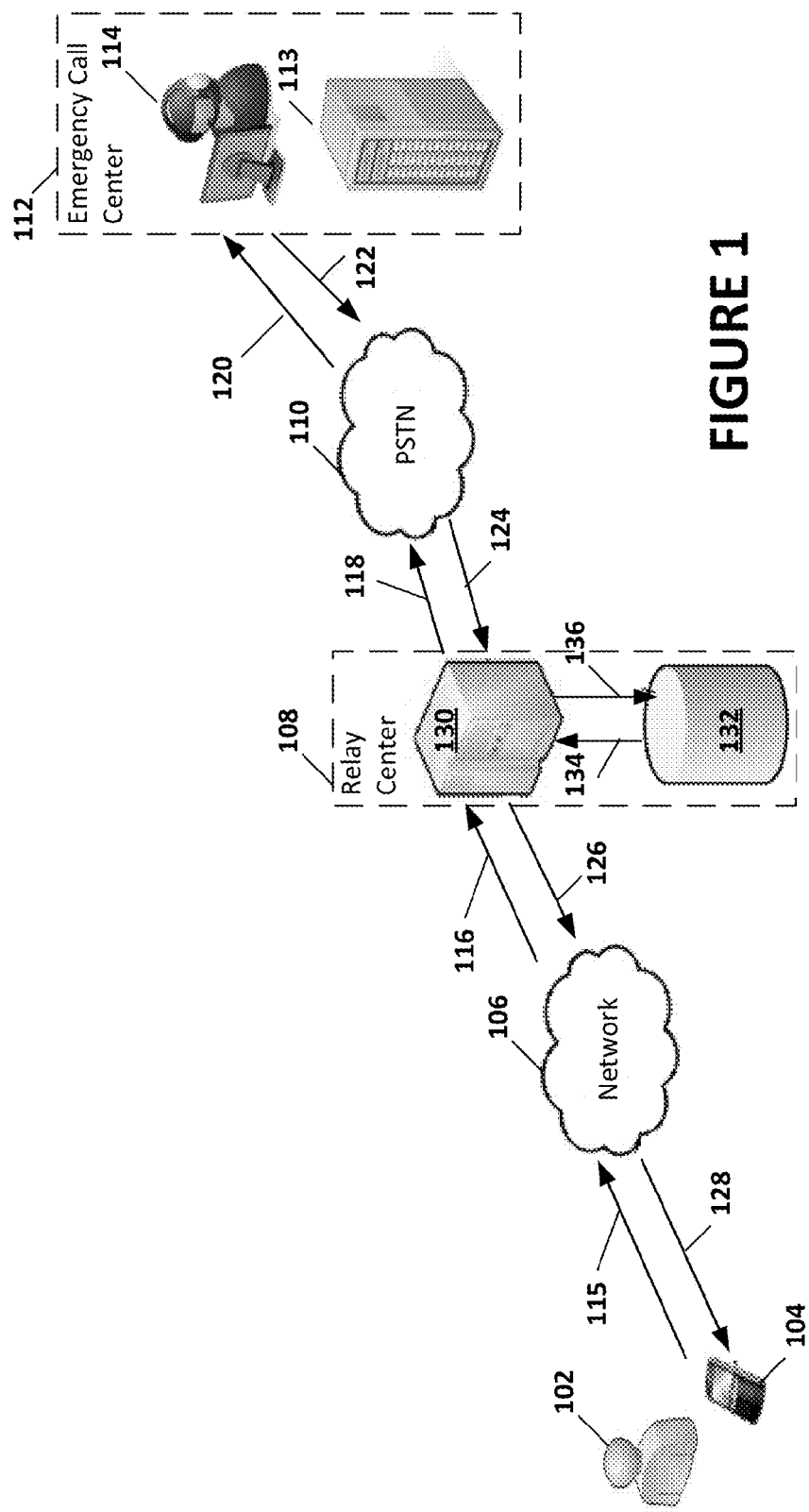
FIG. 1 illustrates an example system and process for providing emergency messages.

FIG. 1 illustrates an example system and process for providing emergency messages to mitigate network congestion. As depicted in FIG. 1, a user (e.g., subscriber) 102, wants to make an emergency call to an emergency call center, for example (e.g., to 9-1-1). The user 102 can initiate a call via a communications device 104, to a relay service center 108, via a network 106. The call can be in the form of any appropriate call or message. In an example embodiment, the communications device 104 may determine a connection mechanism, and may format a message based on the connection mechanism. In another example embodiment, a network entity, such as the relay center 108 for example, may determine the congestion status of a network and/or the connection mechanism of a device. Based on the congestion status, the network entity may grant an access and/or format a message for distribution. If the network is not congested, for example, the network entity may format a message for distribution according to a first format. If the network is congested, for example, the network entity may format a message according to a second format that uses less bandwidth than the first format, thereby mitigating network congestion. In an alternative example scenario, a network entity may determine that the network is congested, and that the connection mechanism of the device is not subject to network constraints. For example, a connection mechanism of the device may comprise a connection that does not utilize certain resources of the wireless network (e.g., 3G, 4G, etc.). Such a connection mechanism may comprise a femtocell connection, Wi-Fi connection, or the like. In such a scenario, the network entity may format a message that is intended for the device according to the first format that may utilize more bandwidth than a second format.

A message may be generated by a device 104. The message may be in the form of a text message, a message comprising video, an instant messaging-like message, a Short Message Service (SMS) message, a Multimedia Messaging Service (MMS) message, a web chat, or the like. The user 102 may start an application that has previously been installed on his/her communications device 104. The application can provide the user 102, via a user interface, or the like, on the communications device 104, the option to initiate a non-voice based (e.g., text based) session. In an example configuration, the message may comprise a connection mechanism indicator. The connection mechanism indicator may indicate the mechanism in which the device 104 is connected to the network 106. For example, the connection mechanism indicator may provide an indication that the device 104 is connected to the network 106 via femtocell, Wi-Fi, 3G, 4G, or the like. The user 102 may compose a non-voice message utilizing SMS, IM, email, or the like, or a combination thereof. For example, the message may comprise a request to access a service provided by the network 106. The user 102, via the communications device 104, may assign the message a special short code or telephone number that may be designated for non-voice to 911 emergency messages.

At steps 115 and 116, the communications device 104 may send the message to the relay center 108 via the network 106 (e.g., radio access network, Wi-Fi, or the like). The relay service center 108 may comprise a network server 130 and a database 132. The network server 130 may comprise any server, processor, computer, or the like, or any appropriate combination thereof. In various example embodiments, the network server 130 may be configured to receive and/or send messages, analyze messages, provide an indication of a message to relay service personnel, assess and/or determine a network congestion status, determine a connection mechanism, or any appropriate combination thereof.

Upon receipt and analysis of the message at the relay service center 108, it may be determined that an emergency condition exists. Examples of emergency conditions may include life threatening health condition (e.g., heart attack) being experienced by the subscriber, life threatening health condition occurring to another individual near the location of the subscriber (e.g., spouse, child, neighbor, friend), fire in the location of the subscriber, fire in the neighboring buildings of the subscriber's location, intruder in the subscriber's home, break-in observed at neighbor's home, automobile accident experienced by the subscriber, and automobile accident observed by the subscriber. The determination may be accomplished via the network server 130, a relay service center person, or any appropriate combination thereof. The message may be analyzed in any appropriate manner to determine if an emergency condition exists. For example this may be determined from content in the body of the message, a header of the message, an identifier embedded in the message, a designated field of the message, video contained in the message, a graphic contained in the message, or the like, or any appropriate combination thereof.

The network server 130 may determine the connection mechanism that corresponds to the communications device 104. The network server 130 may determine that the device 104 is directly connected to the network 106, for example, via a 3G or 4G connection. Alternatively, the network server 130 may determine that the device 104 is indirectly connected to the network 106, for example, via a Wi-Fi or femtocell connection. In an example configuration, the network server 130 may determine a congestion status of the network 106. The congestion status may correspond to the amount of voice and/or data sessions that are active on the network 106, the available bandwidth on the network 106, the utilized bandwidth in the network 106, the access technology associated with the network 106, or any appropriate combination thereof. The network server 130 may be configured, using a database lookup during the configuration of the network server 130, for example, to compare the network congestion status to a predetermined threshold. For example, the network server 130 may retrieve a predetermined congestion threshold associated with the network from the database 132, at 134 and 136. The predetermined threshold may depend on various parameters such as, for example, time of day, time of year, the access technology associated with the network 106, physical limitations of the network, or the like, or any appropriate combination thereof. The network server may compare the network congestion status to the predetermined threshold to determine whether the network is congested. For example, if the congestions status exceeds the predetermined threshold, the network server 130 may determine that the network is congested, and the network server 130 may take appropriate action to mitigate the congestion. For example, message may be formatted in accordance with a second format that uses less bandwidth than a first format. If the congestion status does not exceed the predetermined threshold, for example, the network server 130 may proceed accordingly, such as by enabling high bandwidth communications. For example, the message may be formatted in accordance with the first format.

At steps 118 and 120, the message (e.g., an emergency call) may be sent to the emergency call center 112 via the public switched telephone network (PSTN) 110 or the emergency services network. In an example embodiment, the message may comprise a 9-1-1 call provided via the wireless network 106 and the public switched telephone network 110. The emergency call center 112 may comprise any appropriate emergency call center such as, for example, a PSAP, a fire department, a police station, a public safety office, or the like. A call to the emergency call center 112 can be initiated via any appropriate means for initiating a call to an emergency call center (e.g., 9-1-1 call, call to another number such as fire station, police department, etc., or the like). In an example embodiment, the call to the emergency call center 112 may be a 9-1-1 call that utilizes established mechanisms for location determination and PSAP routing. In the network 106, there may be configuration information that associates every cell site with an appropriate Public Safety Answering Point (PSAP) including instructions on how to address and route calls to that specific PSAP. The network 106 may also comprise configuration information that associates each cell site with a current congestion status. When an emergency call is initiated by the communications device 104, the wireless network 106 may be instructed, via call set-up signaling, that this is an emergency call. As part of the call set-up processing, the network 106 may know the connection mechanism of the device 104. For example, a wireless network may know which cell site is connected to the communications device 104 (commonly called the serving cell). Using the identity of the serving cell, the network 106 may use its internal configuration information to determine the PSAP associated with the serving cell and to determine a congestion threshold associated with the cell site. Using the call routing instructions of the associated PSAP, the emergency voice call is established between the communications device 104 and the emergency call center 112 (also known as a PSAP).

An emergency call taker 114 may receive emergency calls at an emergency call center 112. In an example embodiment, an emergency call taker 114 may use a processor 113 to generate emergency messages for distribution to devices, such as the communications device 104. For example, at steps 115, 116, 118, and 120, a user 102 may use the device 104 to send an emergency message to the emergency call center 112 via the PSTN 110 and the network 106. The emergency call taker 114 may use a processor 113 to determine a congestion status of the network 106. Based on the congestion status, the emergency call center may format a message in response to the emergency call. For example, in response to the emergency call, the emergency call center may determine that mobile devices in a specific geographic region should be informed of emergency information via an emergency alert message. The emergency alert message may be formatted based on a congestion status of the network. If the network congestion does not exceed a predetermined threshold, the emergency call center 112 may format an emergency alert message according to a first format. Such a first format may comprise a high bandwidth component. For example, the first format may comprise a URL, such that each user that receives the URL can activate the URL. By way of another high bandwidth example, the distributed emergency alert message may comprise a video. During an emergency that requires an evacuation, for example, a video may detail escape routes for the recipients of the message. Alternatively, if the network is congested, the emergency call center 112 may distribute emergency alert messages according to a second format that may use less data than the first format. During an emergency that requires an evacuation, for example, an emergency message in accordance with a second format may comprise a text message that describes evacuation routes. In an example embodiment, the relay center may receive an emergency alert message that is formatted in the second format. The relay center 108 may determine the connection mechanism of the device 104. For example, if the relay center 108 determines that the device 104 is connected to the network via an indirect connection such as Wi-Fi or femtocell, the relay center 108 may convert the emergency message to the first format that uses more bandwidth than the second format. The emergency alert messages may be distributed to communications devices, such as device 104 in steps 122, 124, 126, and 128.

As a result of the foregoing described process, network congestion may be mitigated or prevented. Additionally, there may be increased access to wireless networks, and an emergency call taker 114 may be able provide emergency messages efficiently and appropriately. For example, when an emergency call taker is informed or determines that a network is congested, the emergency alert message may be formatted so that it can be successfully received by recipients without overloading the network. When an emergency call taker is informed or determines that a network is congested, the emergency alert message may be formatted so as to provide users with supplemental information, such as video or audio information for example. Further, when an emergency call taker is informed or determines that a device is connected to a network via a Wi-Fi connection or femtocell, the emergency alert message may be formatted so as to provide users with supplemental information, such as video or audio information for example.

Figure 2:
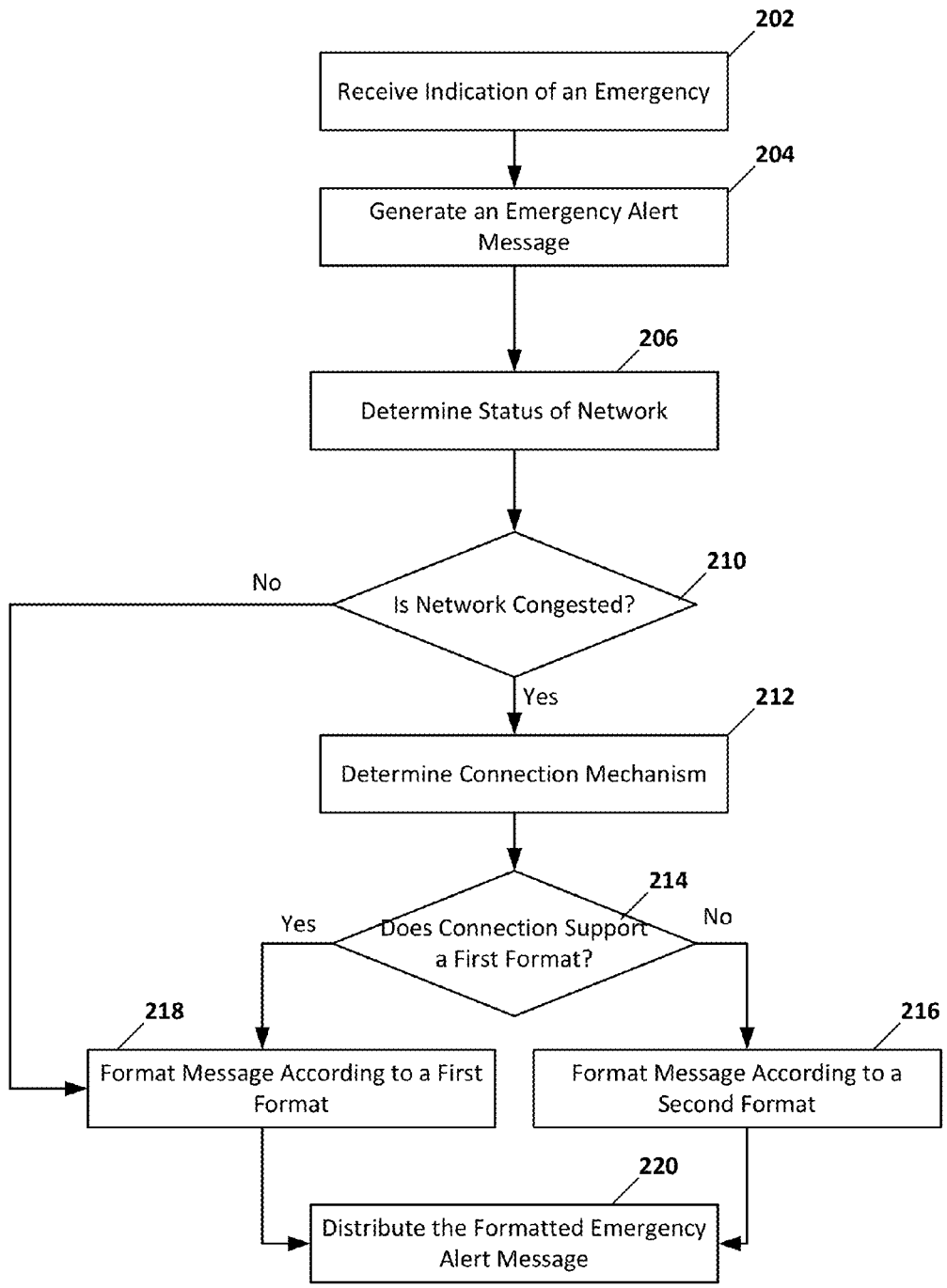
FIG. 2 is a flow diagram of an example process for distributing an emergency alert message.

FIG. 2 is a flow diagram of an example process for distributing an emergency alert message. An indication of an emergency is received at 202. The indication may comprise a 9-1-1 call or the like. The indication may be generated by any appropriate device, such as, for example, a mobile communications device, or the like. In an example embodiment, the emergency indication may be in the form of a text message, a video message, an instant message (IM), a Short Message Service (SMS) message, a Multimedia Messaging Service (MMS) message, web chat, a real-time text (RTT), or the like. The user may compose a non-voice message utilizing SMS, IM, email, or the like, or a combination thereof. The user may assign the message a special short code or telephone number that may be designated for non-voice to 911 emergency messages.

In response to the emergency indication, an emergency alert message may be generated at 204. The emergency alert message may be generated any appropriate device such as, for example, a processor at an emergency alert message or a server at a relay center. For example, the emergency alert message may comprise notice of an impending weather condition or a security condition. At 206, the network traffic may be assessed and a congestion status may be determined. In an example embodiment, the relay center may analyze the network to determine whether the network is in a congested condition. The determination may be accomplished in any appropriate manner such as, for example, from analyzing the available bandwidth of the network, analyzing the active communication session in the network, analyzing the physical limitations of the network, comparing the congestions status to a predetermined congestion threshold, or the like, or any appropriate combination thereof. If it is determined that the network is not congested (at step 210), the process may proceed to step 218. At 218, the emergency alert message may be formatted according to a first format. The first format may provide recipients of the message with supplemental information, such as video or URLs for example, that may not be provided if the network was congested.

If it is determined that the network is congested (at step 210), the process may proceed to step 212. At step 212, a connection mechanism may be determined. In an example embodiment, the relay center may analyze the connection of an intended recipient to determine how the intended recipient is connected to the network. The determination may be accomplished in any appropriate manner such as, for example, from analyzing a connection mechanism indicator that may be included in the emergency indication. After the connection mechanism is determined, a server or processor may determine whether the connection mechanism supports an emergency alert message that is formatted according to the first format, at 214. For example, if the connection mechanism is determined to be an indirect connection such as Wi-Fi or femtocell, the connection mechanism may support the emergency alert message being formatted according to the first format. If it is determined that the connection mechanism supports the first format (at step 214), the process may proceed to step 218. At 218, the emergency alert message may be formatted according to the first format. The first format may provide recipients of the message with supplemental information, such as video or URLs for example, that may not be provided if the network is congested and the intended recipient is directly connected to the network.

If it is determined that the connection mechanism does not supports the first format (at step 214), the process may proceed to step 216. For example, if the connection mechanism is determined to be a direct connection such as 3G or 4G, the connection mechanism may not support the emergency alert message being formatted according to the first format. Thus, at 216, the emergency alert message may be formatted according to a second format. The second format may provide recipients of the message with the emergency alert message in a manner that minimizes bandwidth. For example, the second format may comprise a text message that mitigates network congestion. After the messages is formatted at 216 or 218, the formatted emergency may be distributed at 220. In an example embodiment, intended recipients that are indirectly connected to the network may receive the emergency alert message in the first format while intended recipients that are directly connected to the network may receive the emergency alert message in the second format.

Figure 3:
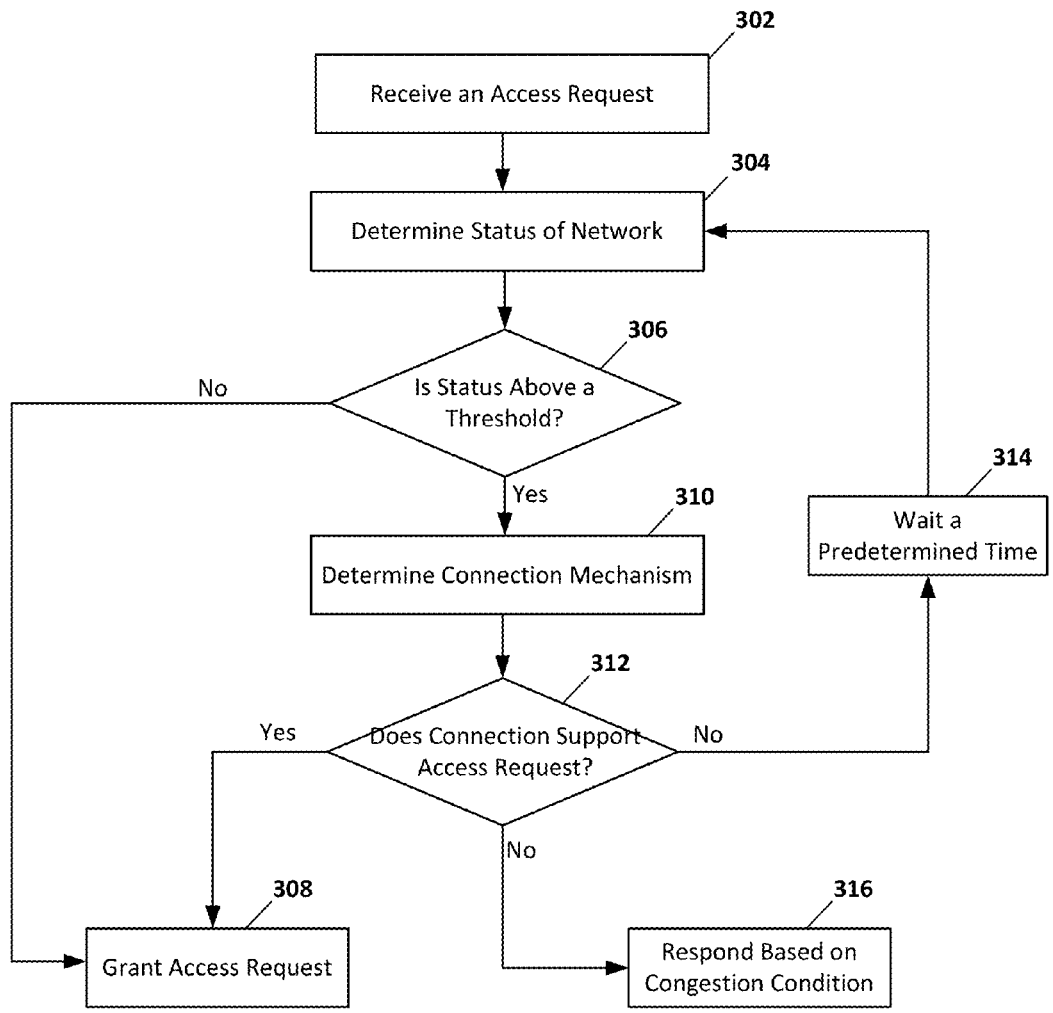
FIG. 3 is a flow diagram of an example process for managing a network access.

FIG. 3 is a flow diagram of an example process for managing a network access. At 302, a message comprising an access request may be received via a network, for example, by a relay center. In an example embodiment, the access request may be initiated by a communications device in response to receiving an emergency alert message. For example, an access request may comprise a request to access a service that is provided by a network, such as a request to view a video or activate a URL. The message comprising the access request may further comprise a communication mechanism indicator, which may indicate the manner in which the communications device is connected to a network. At 304, the network may be assessed and a network congestion status may be determined. In an example embodiment, the relay center may analyze the network to determine the congestion status of the network. The determination may be accomplished in any appropriate manner such as, for example, from analyzing the available bandwidth of the network, analyzing the active communication sessions in the network, analyzing the physical limitations of the network, or the like, or any appropriate combination thereof. At 306, the congestion status may be compared to congestion threshold to determine whether the congestion status exceeds the threshold. The threshold may be based on various network parameters such as, without limitation, time of day, the access technology of the network, available resources of the network, time of year, or any appropriate combination thereof. If it is determined that the congestion status does not exceed a predetermined threshold (at step 306), the process may proceed to step 308. At 308, access request may be granted. For example, communications device may activate the URL or video that it requested to access, via the network that was assessed.

If it is determined that the congestion status of the network exceeds the predetermined threshold (at step 306), the process may proceed to step 310. At step 310, a connection mechanism may be determined. In an example embodiment, the relay center may analyze the connection of an intended recipient to determine how the intended recipient is connected to the network. The determination may be accomplished in any appropriate manner such as, for example, from analyzing a connection mechanism indicator that may be included in the access request or from analyzing a user profile that is associated with the communications device, or the like. For example, the connection mechanism may be determined to be a direct connection such as 3G or 4G, or an indirect connection such as Wi-Fi or femtocell. After the connection mechanism is determined, a server or processor may determine whether the connection mechanism supports the access request, at 312. For example, if the connection mechanism is determined to be an indirect connection such as Wi-Fi or femtocell, the connection mechanism may support an access request for a high bandwidth service. If it is determined that the connection mechanism supports the access request (at step 312), the process may proceed to step 308, where access to the service is granted and the communications device may access the service.

If it is determined that the connection mechanism does not support the access request (at step 312), the process may proceed to step 314. For example, it may be determined that a device is connected to the network via a 3G connection that is congested. At 314, a relay center server or network access server may wait for a predetermined time. After the predetermined time elapses, the process may return to step 304 where the network congestion status of the network may be determined again. For example, after the predetermined time elapses, the network congestion status may decrease and may be less than the threshold, and thus the access may granted at 318. Alternatively, if it is determined that the connection mechanism does not support the access request (at step 312), a response may be generated based on the congestion condition at 316. For example, a response may inform a user that the network is congested and that the user may try to access the service at a later time. Such a response may comprise an error message, a busy message, a network congestion status message, or the like. By way of another example, but without limitation, such a response may grant the user limited access to the requested service, thereby mitigating the network congestion. Granting a limited access may use less network resources than granting the access request. For example, if the user requests access to a video, the response may grant access to audio that is associated with the video, thereby providing the user with a limited access based on the access request.

Figure 4:
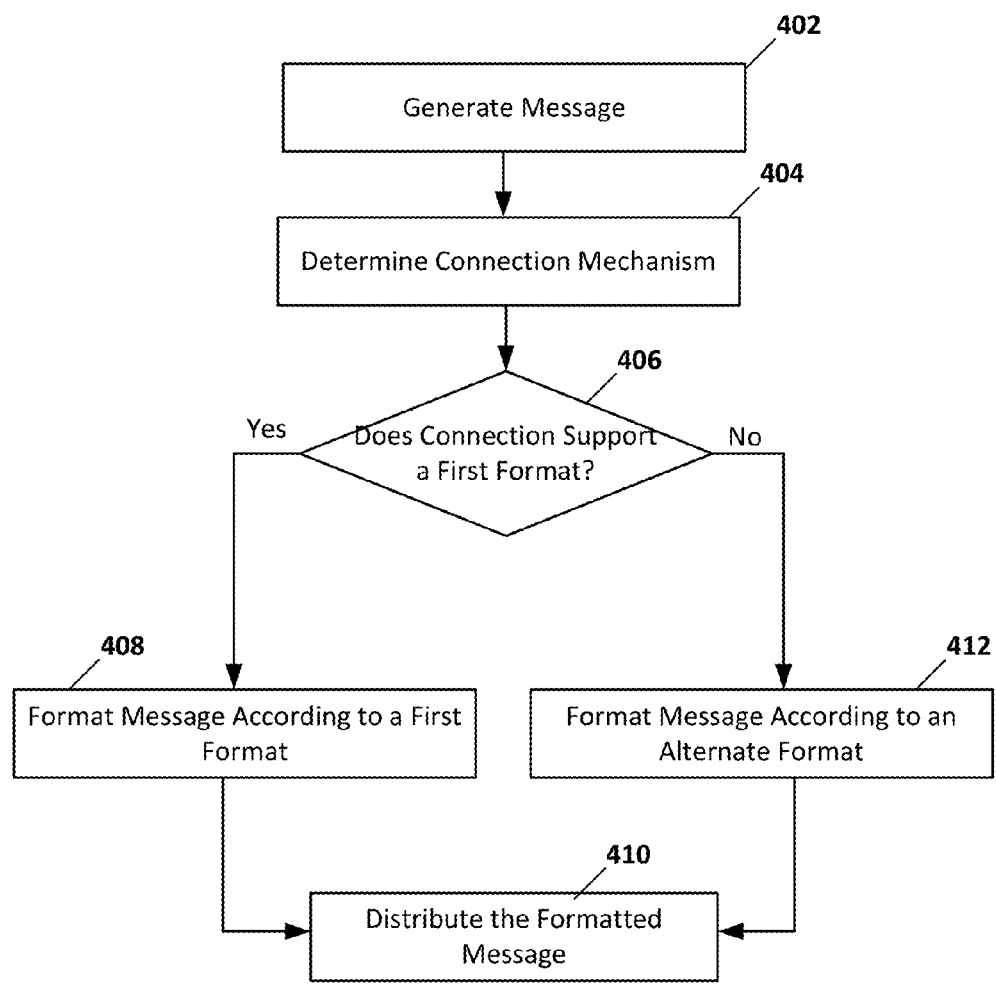
FIG. 4 is a flow diagram of an example process for formatting a message based at least on a connection mechanism.

FIG. 4 is a flow diagram of an example process for formatting a message based at least on a connection mechanism. At 402, a device, such as a mobile combinations device for example, may generate a message. At 404, the device may determine its connection mechanism. The connection mechanism of the device may refer to how the device is connected to a network. For example, the device may be connected to the network via a femtocell, Wi-Fi, 3G, 4G, or the like. The connection mechanism may be associated with a data rate. At 406, the device may determine whether its connection mechanism supports messages that are formatted according to a first format. The connection mechanism may support messages that comprise a first format, for example, if the data rate of connection mechanism is at least equal to the minimum data rate of the first format. If the connection mechanism supports messages that are formatted according to the first format, the device may format the message according to the first format, at 408. If the connection mechanism does not support messages that are formatted according to the first format, the device may format the message according to an alternate forma, at 412. Such an alternate format may require less network resources than the first format. At 410, the formatted messages may be sent, for example, to a relay center.

Figure 5:
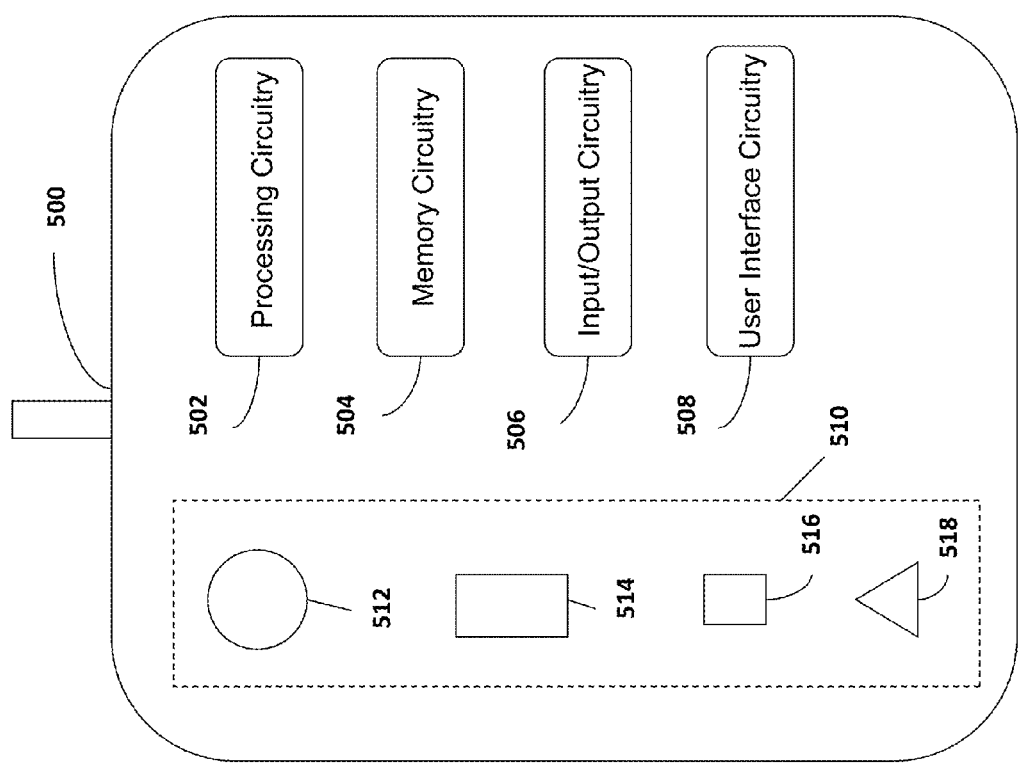
FIG. 5 is a block diagram of an example wireless communications device that is configurable to a format message based on a connection mechanism.

FIG. 5 is a block diagram of an example communications device 500 that is configurable to initiate a call to an emergency call center and imitate a network access request. In an example embodiment, the communication device 500 may comprise the communications device 104 described herein, for example, with respect to FIG. 1. In an example configuration, communications device 500 comprises a mobile wireless device. The communications device 500, however, may comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The communications device 500 can include devices that are not typically thought of as portable, such as, for example, a public computing device, a navigation device installed in-vehicle, a set top box, or the like. The mobile communications device 500 can include non-conventional computing devices, such as, for example, a kitchen appliance, a motor vehicle control (e.g., steering wheel), etc., or the like. As evident from the herein description a communications device, a mobile device, or any portion thereof is not to be construed as software per se.

The communications device 500 may include any appropriate device, mechanism, software, and/or hardware for facilitating network congestion mitigation as described herein. In an example embodiment, the ability to determine or provide a connection mechanism is a feature of the communications device 500 that can be turned on and off. Thus, in an example embodiment, an owner of the communications device 500 may opt-in or opt-out of these capabilities.

In an example embodiment, the communications device 500 comprises a processor and memory coupled to the processor. The memory may comprise executable instructions that when executed by the processor cause the processor to effectuate operations associated with network congestion mitigation.

In an example configuration, the communications device 500 comprises a processing portion 502, a memory portion 504, an input/output portion 506, a user interface (UI) portion 508, and sensor circuitry 510 comprising at least one of a video camera portion 512, a force/wave sensor 514, a microphone 516, a moisture sensor 518, or a combination thereof. Each portion of the communications device 500 comprises circuitry for performing functions associated with each respective portion. Thus, each portion can comprise hardware, or a combination of hardware and software. Accordingly, each portion of the communications device 500 is not to be construed as software per se. It is emphasized that the block diagram depiction of communications device 500 is exemplary and not intended to imply a specific implementation and/or configuration. For example, in an example configuration, the communications device 500 may comprise a cellular phone and the processing portion 502 and/or the memory portion 504 may be implemented, in part or in total, on a subscriber identity module (SIM) of the mobile communications device 500. In another example configuration, the communications device 500 may comprise a laptop computer. The laptop computer can include a SIM, and various portions of the processing portion 502 and/or the memory portion 504 can be implemented on the SIM, on the laptop other than the SIM, or any combination thereof.

The processing portion 502, memory portion 504, and input/output portion 506 are coupled together to allow communications therebetween. In various embodiments, the input/output portion 506 comprises a receiver of the communications device 500, a transmitter of the communications device 500, or a combination thereof. The input/output portion 506 is capable of receiving and/or providing information pertaining to network congestion mitigation as described herein. In various configurations, the input/output portion 506 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 502 may be capable of performing functions pertaining to network congestion mitigation and/or prevention as described herein. In a basic configuration, the communications device 500 may include at least one memory portion 504. The memory portion 504 may comprise a storage medium having a tangible physical structure. Thus, the memory portion 504, as well as any computer-readable storage medium described herein, is not to be construed as a transient signal per se. Further, the memory portion 504, as well as any computer-readable storage medium described herein, is not to be construed as a propagating signal per se. The memory portion 504 may store any information utilized in conjunction with network congestion mitigation as described herein. Depending upon the exact configuration and type of processor, the memory portion 504 may be volatile (such as some types of RAM), non-volatile (such as ROM, flash memory, etc.), or a combination thereof. The mobile communications device 500 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 500.

The communications device 500 also may contain a user interface (UI) portion 508 allowing a user to communicate with the communications device 500. The UI portion 508 may be capable of rendering any information utilized in conjunction with network congestion mitigation services as described herein. The UI portion 508 may provide the ability to control the communications device 500, via, for example, buttons, soft keys, voice actuated controls, a touch screen, movement of the mobile communications device 500, visual cues (e.g., moving a hand in front of a camera on the mobile communications device 500), or the like. The UI portion 508 may provide visual information (e.g., via a display), audio information (e.g., via speaker), mechanically (e.g., via a vibrating mechanism), or a combination thereof. In various configurations, the UI portion 508 may comprise a display, a touch screen, a keyboard, an accelerometer, a motion detector, a speaker, a microphone, a camera, a tilt sensor, or any combination thereof. The UI portion 508 may comprise means for inputting biometric information, such as, for example, fingerprint information, retinal information, voice information, and/or facial characteristic information.

The UI portion 508 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user in entering message content, viewing received messages, answering/initiating calls, entering/deleting data, entering and setting user IDs and passwords, configuring settings, manipulating content and/or settings, interacting with other applications, or the like, and may aid the user in inputting selections associated with network congestion mitigation as described herein.

Figure 6:
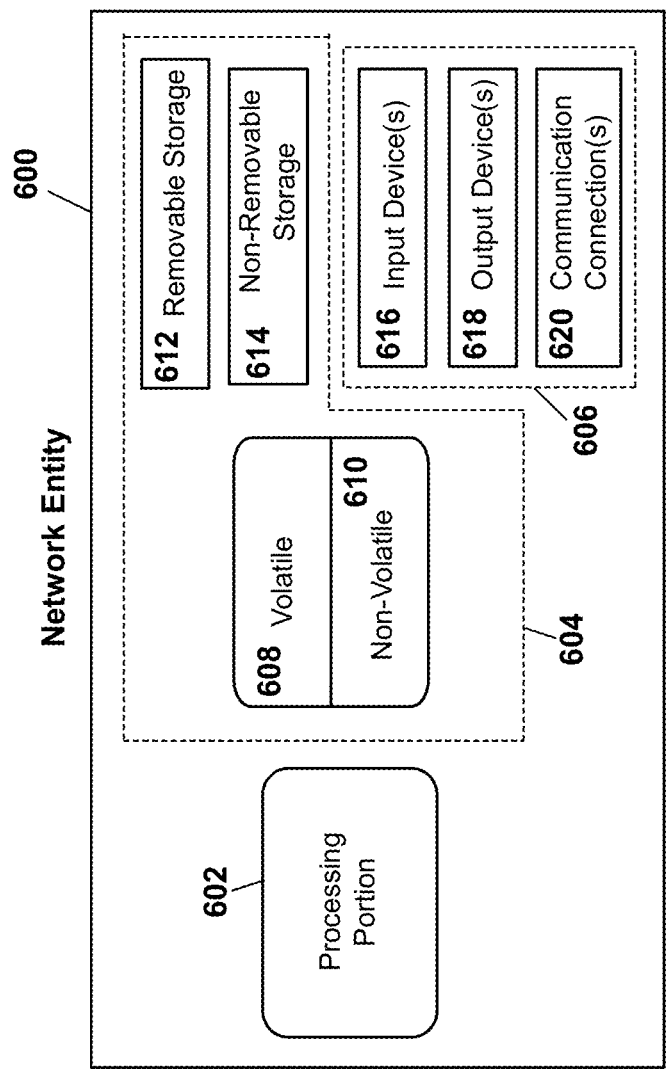
FIG. 6 is a block diagram of an example relay service server.

FIG. 6 is a block diagram of an example network entity 600 for facilitating network congestion mitigation. The network entity 600 may comprise hardware or a combination of hardware and software. The functionality needed to facilitate network congestion mitigation may reside in any one or combination of network entities 600. The network entity 600 depicted in FIG. 6 may represent any appropriate network entity, or combination of apparatuses, such as a processor, a server, a gateway, a node, any appropriate entity, or any appropriate combination thereof. In an example embodiment, the network entity 600 may comprise the network server 130, the emergency call center processor 113, or any appropriate combination thereof. It is emphasized that the block diagram depicted in FIG. 6 is exemplary and not intended to imply a specific implementation or configuration. Thus, the network entity 600 may be implemented in a single processor or multiple processors (e.g., single server or multiple servers, single gateway or multiple gateways, single system or multiple systems, etc.). Multiple systems may be distributed or centrally located. Multiple systems may communicate wirelessly, via hard wire, or a combination thereof.

The network entity 600 may comprise hardware or a combination of hardware and software. When used in conjunction with a network, the functionality needed to determine a network congestion status and determine whether the status exceeds a congestion threshold can reside in any one or combination of network entities. The network entity 600 depicted in FIG. 6 represents any appropriate network entity, or combination of network entities, such as a processor, a server, a gateway, a node, any appropriate entity depicted in FIG. 7, any appropriate entity depicted in FIG. 8, any appropriate entity depicted in FIG. 9, any appropriate entity depicted in FIG. 10, the relay server depicted in FIG. 1, any appropriate entity, component, device, and/or circuitry of the relay center depicted in FIG. 1, any appropriate entity, component, device, and/or circuitry of the network depicted in FIG. 1, any appropriate entity, component, device, and/or circuitry of the emergency services network depicted in FIG. 1, any appropriate entity, component, device, and/or circuitry of the PSAP depicted in FIG. 1, or any appropriate combination thereof. In an example configuration, the network entity 600 comprises a component or various components of a cellular broadcast system wireless network. It is emphasized that the block diagram depicted in FIG. 6 is exemplary and not intended to imply a specific implementation or configuration. Thus, the network entity 600 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example embodiment, the network entity 600 comprises a processor and memory coupled to the processor. The memory may comprise executable instructions that when executed by the processor cause the processor to effectuate operations associated with network congestion mitigation. As evident from the herein description, a system or any portion thereof is not to be construed as software per se.

In an example embodiment, the network entity 600 comprises a processor and memory coupled to the processor. The memory may comprise executable instructions that when executed by the processor cause the processor to effectuate operations associated with network congestion mitigation services.

In an example configuration, the network entity 600 comprises a processing portion 602, a memory portion 604, and an input/output portion 606. The processing portion 602, memory portion 604, and input/output portion 606 are coupled together (coupling not shown in FIG. 6) to allow communications therebetween. The input/output portion 606 may be capable of receiving and/or providing information from/to a communications device and/or other network entities configured to be utilized with network congestion mitigation services. For example, the input/output portion 606 may include a wireless communications (e.g., 2.5G/3G/4G/GPS) card. The input/output portion 606 may be capable of receiving and/or sending video information, audio information, control information, image information, data, or any combination thereof. In an example embodiment, the input/output portion 606 may be capable of receiving and/or sending information to determine a congestion status of a network and/or the connection mechanism of a communications device 500. In an example configuration, the input\output portion 606 may comprise and/or be coupled to a GPS receiver. In an example configuration, the network entity 600 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 606 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WI-FI finder, a two way GPS chipset or equivalent, or the like, or a combination thereof.

The processing portion 602 may be capable of performing functions associated with network congestion mitigation as described herein. That is, a communications device (e.g., communications device 104) may perform functions internally (by the device) and/or utilize the netowrk entity 600 to perform functions. For example, the processing portion 602 may be capable of, in conjunction with any other portion of the network entity 600, installing an application for network congestion mitigation, processing an application for network congestion mitigation, configuring the network entity 600 to function as a gateway for other devices to a network, determining the threshold at which the network is congested, or the like, or any combination thereof. The processing portion 602, in conjunction with any other portion of the network entity 600, enables the network entity 600 to format messages into various formats when it is configured to mitigate network congestion.

In a basic configuration, the network entity 600 may include at least one memory portion 604. The memory portion 604 may comprise a storage medium having a tangible physical structure. Thus, the memory portion 604, as well as any computer-readable storage medium described herein, is not to be construed as a transient signal per se. The memory portion 604, as well as any computer-readable storage medium described herein, is not to be construed as a propagating signal per se. The memory portion 604 may store any information utilized in conjunction with network congestion mitigation services as described herein. Depending upon the exact configuration and type of processor, the memory portion 604 may be volatile 608 (such as some types of RAM), non-volatile 610 (such as ROM, flash memory, etc.), or a combination thereof. The network entity 600 may include additional storage (e.g., removable storage 612 and/or non-removable storage 614) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 600.

The network entity 600 also may contain communications connection(s) 620 that allow the network entity 600 to communicate with other devices, systems, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The network entity 600 also can include input device(s) 616 such as keyboard, mouse, pen, voice input device, touch input device, etc. Output device(s) 618 such as a display, speakers, printer, etc. also can be included.

Network congestion mitigation services may be implemented in conjunction with various wireless communications networks. Some of which are described below.

Figure 7:
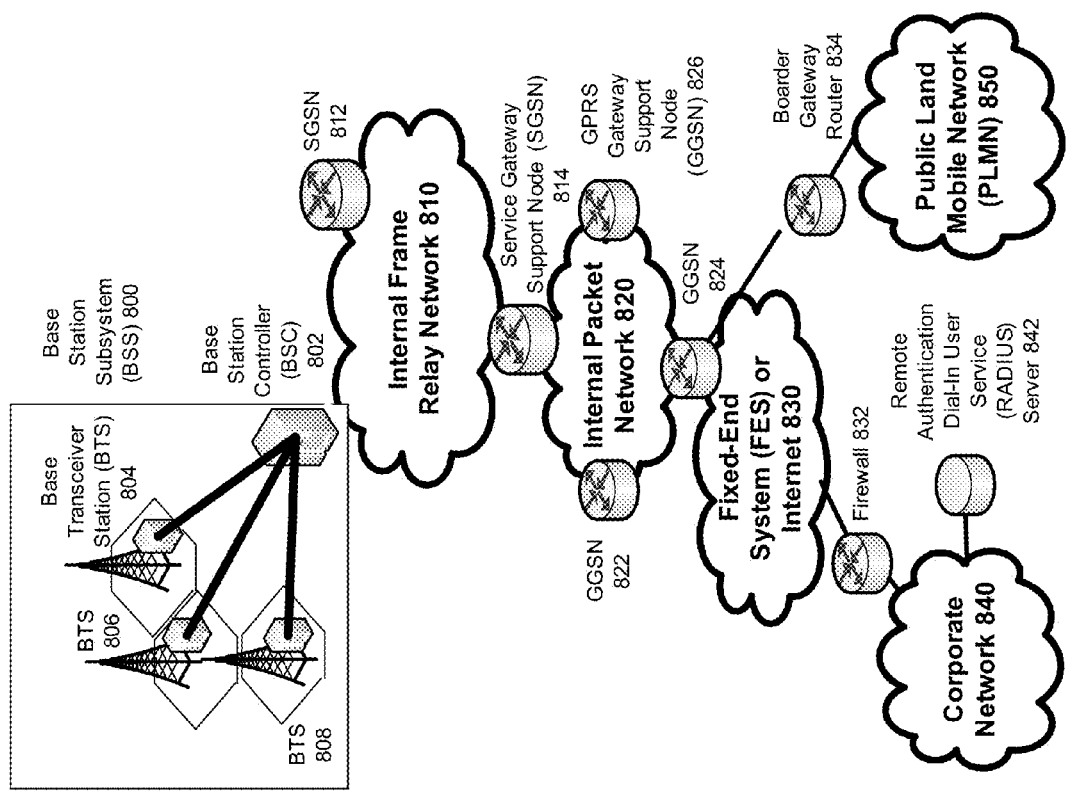
FIG. 7 depicts an overall block diagram of an exemplary packet-based mobile cellular network environment, such as a GPRS network, in which network management mechanisms may be implemented.

FIG. 7 depicts an overall block diagram of an example packet-based mobile cellular network environment, such as a GPRS network, within which enhanced location based services may be implemented. In the example packet-based mobile cellular network environment shown in FIG. 7, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 8:
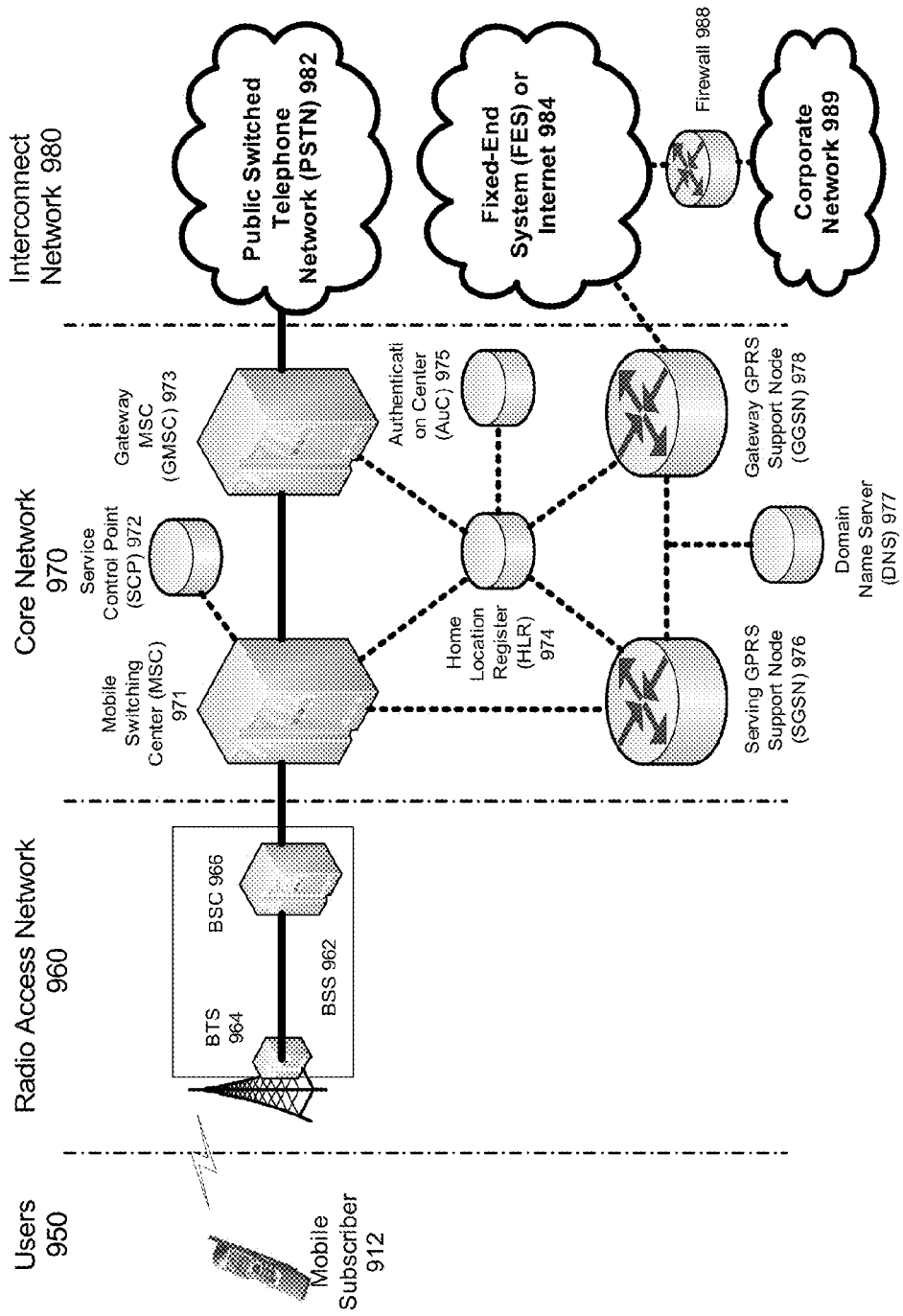
FIG. 8 illustrates an architecture of a typical GPRS network in which network management mechanisms may be implemented.

FIG. 8 illustrates an architecture of a typical GPRS network within which text message generation for emergency services can be implemented. The architecture depicted in FIG. 8 is segmented into four groups: users 950, radio access network 960, core network 970, and interconnect network 980. Users 950 comprise a plurality of end users. Note, device 912 is referred to as a mobile subscriber in the description of network shown in FIG. 8. In an example embodiment, the device depicted as mobile subscriber 912 comprises a communications device (e.g., communications device 104). Radio access network 960 comprises a plurality of base station subsystems such as BSSs 962, which include BTSs 964 and BSCs 966. Core network 970 comprises a host of various network elements. As illustrated in FIG. 8, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 8, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 8, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 9:
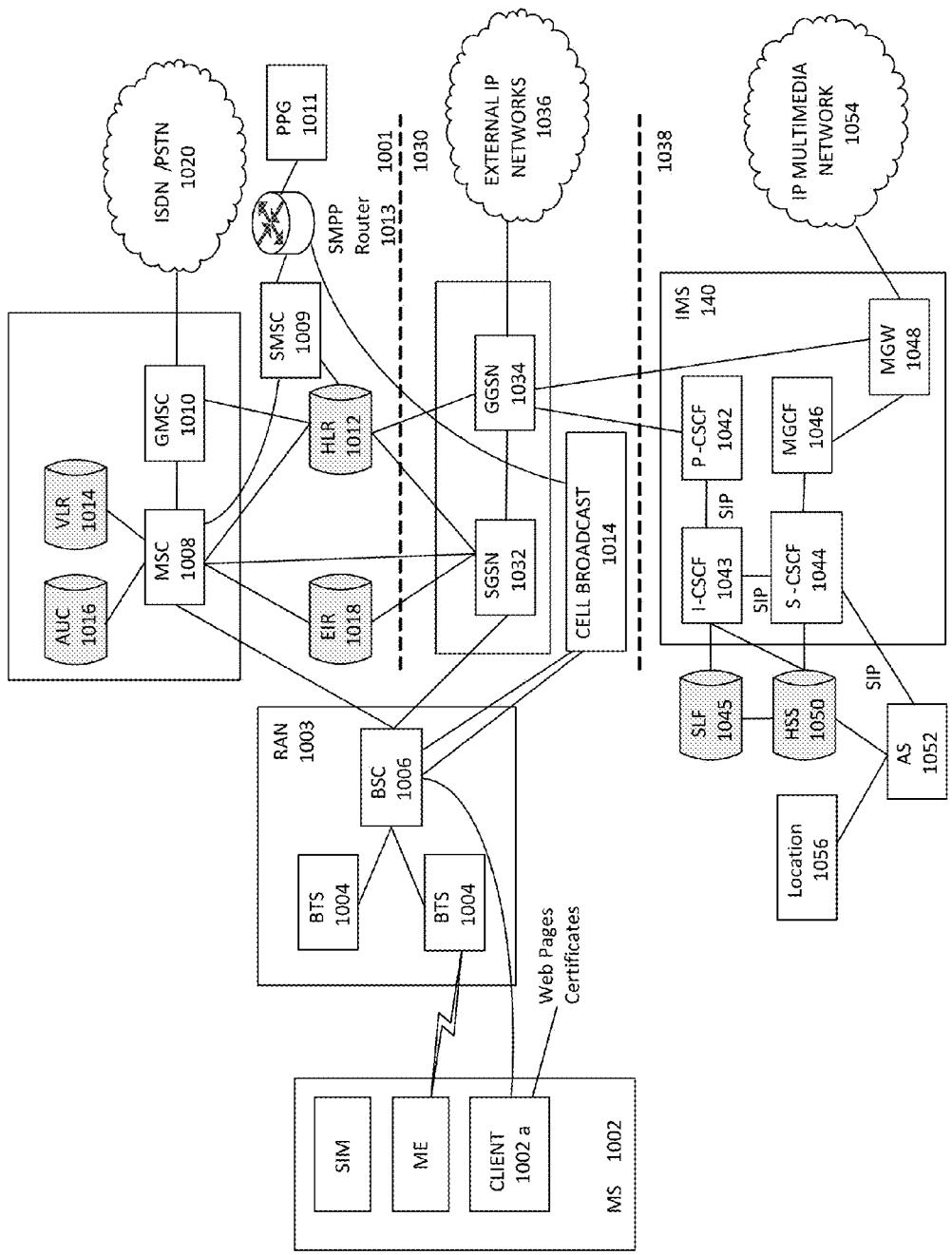
FIG. 9 illustrates an exemplary block diagram view of a GSM/GPRS/IP multimedia network architecture within which network management mechanisms may be implemented.

FIG. 9 illustrates an example block diagram view of a GSM/GPRS/IP multimedia network architecture within which text message generation for emergency services may be implemented. As illustrated, the architecture of FIG. 9 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1017 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP)

context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 10:
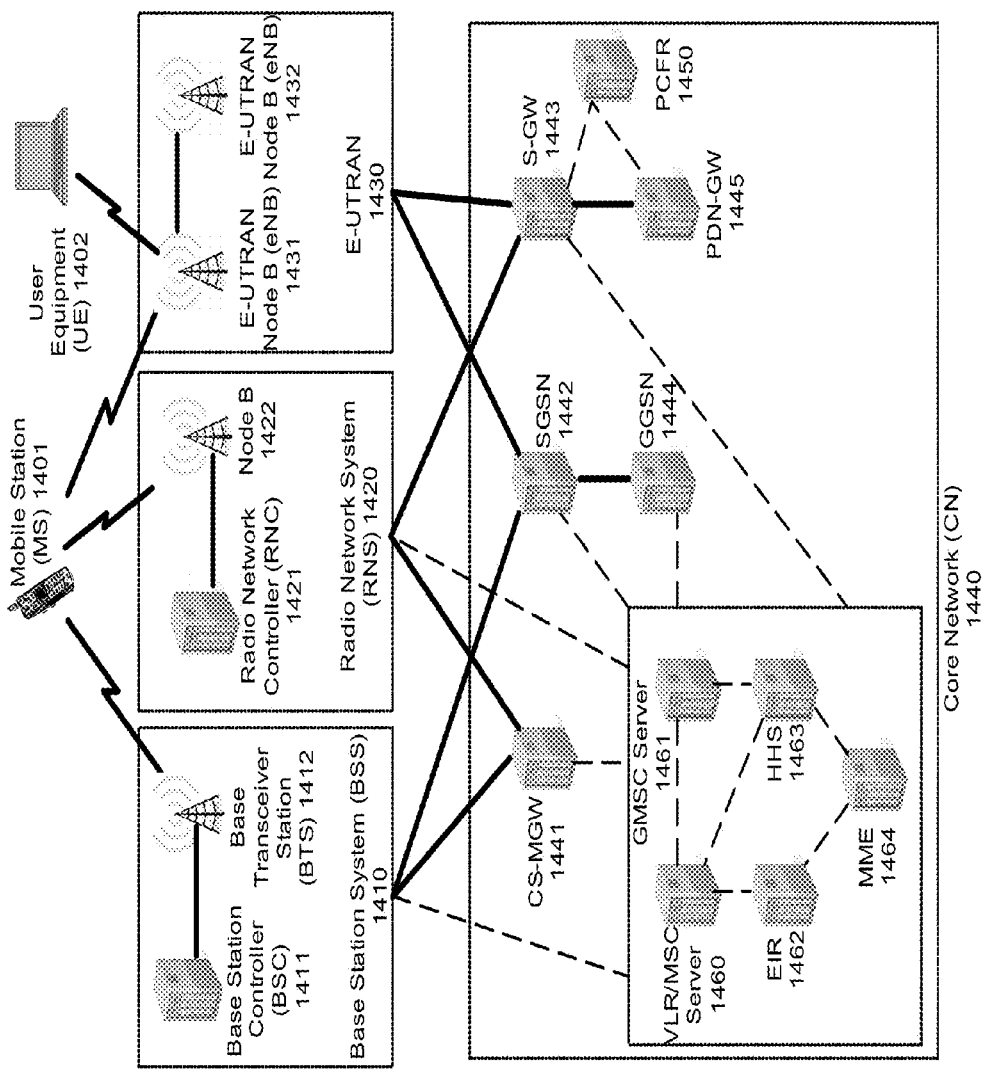
FIG. 10 illustrates a PLMN block diagram view of an exemplary architecture in which network management mechanisms may be incorporated.

FIG. 10 illustrates a PLMN block diagram view of an example architecture in which text message generation for emergency services may be incorporated. Mobile Station (MS) 1401 is the physical equipment used by the PLMN subscriber. In one illustrative embodiment, communications device 104 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 10 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of network congestion mitigation services have been described in connection with various computing devices/processors, the underlying concepts may be applied to any computing device, processor, or system capable of implementing enhanced location based services. The various techniques described herein can be implemented in connection with hardware or software or, where appropriate, with a combination of both. Thus, the methods and apparatuses of using and implementing network congestion mitigation services may be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not a transient signal per se. A computer-readable storage medium is not a propagating signal per se. When the program code is loaded into and executed by a machine, such as a computer, the machine becomes an apparatus for implementing enhanced location based services. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for using and implementing network congestion mitigation services also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing enhanced location based services. When implemented on a general-purpose processor, the program code combines with the processor to provide a unique apparatus that operates to invoke the functionality of enhanced location based services.

While network congestion mitigation services have been described in connection with the various embodiments of the various figures, it is to be understood that other similar embodiments can be used or modifications and additions can be made to the described embodiments for implementing enhanced location based services without deviating therefrom. For example, one skilled in the art will recognize that network congestion mitigation services as described in the present application may apply to any environment, whether wired or wireless, and may be applied to any number of such devices connected via a communications network and interacting across the network. Therefore, network congestion mitigation services should not be limited to any single embodiment, but rather should be construed in breadth and scope in accordance with the appended claims.

What is claimed:

1. A method comprising:
receiving an indication of an emergency via a network;
in response to the indication, generating an emergency alert message;
determining a congestion status of the network;
comparing the congestion status of the network to a predetermined threshold;
formatting the emergency alert message based at least on the congestion status;
determining a connection mechanism of a device that is an intended recipient of the formatted emergency alert message;
determining whether the connection mechanism supports a message formatted according to a first format that uses more network resources than a message formatted according to a second format;
if the congestion status of the network exceeds the predetermined threshold and the
the connection mechanism does not supports a message formatted according to a first format, formatting the emergency alert message according to the second format; and
distributing the formatted emergency alert message.

2. The method of claim 1, the method further comprising:
if the congestion status does not exceed the predetermined threshold, formatting the emergency alert message in accordance with the first format;
if the congestion status exceeds the predetermined threshold, formatting the emergency alert message in accordance with the second format that uses less resources of the network than the first format.

3. The method of claim 1, the method further comprising:
if the connection mechanism supports the first format, formatting the emergency alert message in accordance with the first format.

4. The method of claim 1, wherein the connection mechanism comprise at least one of a 3G connection or a 4G connection.

5. The method of claim 1, wherein the formatted emergency alert message is distributed by an emergency call center.

6. A device comprising:
a memory comprising executable instructions; and
a processor in communication with the memory, the instructions, when executed by the processor, cause the processor to effectuate operations comprising:
receiving an indication of an emergency via a network;
in response to the indication, generating an emergency alert message;
determining a congestion status of the network;
comparing the congestion status of the network to a predetermined threshold;
formatting the emergency alert message based at least on the congestion status;
determining a connection mechanism of a device that is an intended recipient of the formatted emergency alert message;
determining whether the connection mechanism supports a message formatted according to a first format that uses more network resources than a message formatted according to a second format;
if the congestion status of the network exceeds the predetermined threshold and the
the connection mechanism does not supports a message formatted according to a first format, formatting the emergency alert message according to the second format; and
distributing the formatted emergency alert message.

7. The device of claim 6, wherein the processor is further configured to execute the instructions to perform operations comprising:

if the congestion status does not exceed the predetermined threshold, formatting the emergency alert message in accordance with the first format;

if the congestion status exceeds the predetermined threshold, formatting the emergency alert message in accordance with the second format that uses less resources of the network than the first format.

8. The device of claim 6, wherein the processor is further configured to execute the instructions to perform operations comprising:

if the connection mechanism supports the first format, formatting the emergency alert message in accordance with the first format.

9. The device of claim 6, wherein the connection mechanism comprise at least one of a 3G connection or a 4G connection.

10. The device of claim 6, wherein the formatted emergency alert message is distributed by an emergency call center.

11. A computer-readable storage medium comprising instructions that when executed by a processor, cause the processor to effectuate operations comprising:

receiving an indication of an emergency via a network;

in response to the indication, generating an emergency alert message;

determining a congestion status of the network;

comparing the congestion status of the network to a predetermined threshold;

formatting the emergency alert message based at least on the congestion status;

determining a connection mechanism of a device that is an intended recipient of the formatted emergency alert message;

determining whether the connection mechanism supports a message formatted according to a first format that uses more network resources than a message formatted according to a second format;

if the congestion status of the network exceeds the predetermined threshold and the the connection mechanism does not supports a message formatted according to a first format, formatting the emergency alert message according to the second format; and distributing the formatted emergency alert message.

12. The computer-readable storage medium of claim 11, the operations further comprising:

if the congestion status does not exceed the predetermined threshold, formatting the emergency alert message in accordance with the first format;

if the congestion status exceeds the predetermined threshold, formatting the emergency alert message in accordance with the second format that uses less resources of the network than the first format.

13. The computer-readable storage medium of claim 11, the operations further comprising:

if the connection mechanism supports the first format, formatting the emergency alert message in accordance with the first format.

14. The computer-readable storage medium of claim 11, wherein the connection mechanism comprise at least one of a 3G connection or a 4G connection.

15. The computer-readable storage medium of claim 11, wherein the formatted emergency alert message is distributed by an emergency call center.

* * * * *